(12) United States Patent
Takada (10) Patent No.: US 10,127,411 B2
(45) Date of Patent: Nov. 13, 2018

(54) IMAGE FORMING APPARATUS THAT FORMS AN IMAGE WITH A DECOLORABLE MATERIAL ON AN RFID TAG

(71) Applicants: KABUSHIKI KAISHA TOSHIBA, Tokyo (JP); TOSHIBA TEC KABUSHIKI KAISHA, Tokyo (JP)

(72) Inventor: Setsuo Takada, Izunokuni Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/804,236

(22) Filed: Nov. 6, 2017

(65) Prior Publication Data

US 2018/0056697 A1    Mar. 1, 2018

Related U.S. Application Data

(63) Continuation of application No. 15/202,081, filed on Jul. 5, 2016, now Pat. No. 9,834,024.

(51) Int. Cl.
*G06K 7/10* (2006.01)
*G06K 1/12* (2006.01)

(52) U.S. Cl.
CPC ......... *G06K 7/10009* (2013.01); *G06K 1/126* (2013.01)

(58) Field of Classification Search
CPC ....... B41M 7/00; B41M 7/0009; B41M 7/009
See application file for complete search history.

(56) References Cited

U.S. PATENT DOCUMENTS

| 2006/0265332 A1 | 11/2006 | Goffinet et al. |
| 2015/0277305 A1 | 10/2015 | Umetsu |

FOREIGN PATENT DOCUMENTS

JP    2005225043 A    8/2005

*Primary Examiner* — Kristal Feggins
(74) *Attorney, Agent, or Firm* — Patterson & Sheridan, LLP (57) ABSTRACT

An image forming apparatus includes a first image forming unit configured to form an image with a decolorable material, a second image forming unit configured to form an image with a non-decolorable material, an RFID processor configured to write data in an RFID tag, a memory unit for storing a table indicating one or more attributes associated with the decolorable material and one or more attributes associated with the non-decolorable material, and a controller configured to control the first image forming unit to carry out image forming on a medium including the RFID tag for information of which attribute is associated with the decolorable material in the table, and control the second image forming unit to carry out image forming on the medium for information of which attribute is associated with the non-decolorable material in the table.

20 Claims, 5 Drawing Sheets

| ATTRIBUTE | BUILT-IN MEMORY S11 OF RFID TAG S1 | | SELECTION OF RECORDING AGENT | |
|---|---|---|---|---|
| | FIRST MEMORY REGION S11a | SECOND MEMORY REGION S11b | DECOLORABLE RECORDING AGENT | NON-DECOLORABLE RECORDING AGENT |
| COMPANY NAME | | ○ | | ○ |
| EMPLOYEE NUMBER | | ○ | | ○ |
| NAME | | ○ | ○ | |
| AGE | ○ | | ○ | |
| AFFILIATION | ○ | | ○ | |
| ADDRESS | ○ | | ○ | |
| TELEPHONE NUMBER | ○ | | — | — |
| ... | ... | ... | ... | ... |

FIG. 4

XX CORPORATION — 501

YYDEPARTMENT ZZSECTION — 502

EMPLOYEE NUMBER: AAA123 — 503

NAME: YAMADA XYZ — 504      AGE: 30 YEARS OLD — 505

ADDRESS: AA PREFECTURE BB CITY CC TOWN 10-1 — 506

S1

FIG. 6 ated with the non-decolorable material in the table.

IMAGE FORMING APPARATUS THAT FORMS AN IMAGE WITH A DECOLORABLE MATERIAL ON AN RFID TAG

CROSS-REFERENCE TO RELATED APPLICATION

This application is a continuation of U.S. patent application Ser. No. 15/202,081, filed on Jul. 5, 2016, the entire contents of which are incorporated herein by reference.

FIELD

Embodiments described herein relate generally to an image forming apparatus, in particular, an image forming apparatus that forms an image with a decolorable material on an RFID tag.

BACKGROUND

An employee in a company may hold an employee identification card or a name tag on which an image of personal information is printed, for identification of the employee. The personal information printed on such an employee identification card, a name tag, or the like (below referred to as an image formation medium) typically include only minimum information necessary for the identification. When the personal information printed on the employee identification card is changed for certain reasons, a new employee identification card with the changed personal information printed thereon is issued to replace the old employee identification card. Preservation of the image formation medium (cards) without replacement of card would be desirable even upon such change of personal information.

DETAILED DESCRIPTION

According to an embodiment, an image forming apparatus includes a first image forming unit configured to form an image with a decolorable material, a second image forming unit configured to form an image with a non-decolorable material, an RFID processor configured to write data in an RFID tag, a memory unit for storing a table indicating one or more attributes associated with the decolorable material and one or more attributes associated with the non-decolorable material, and a controller configured to control the first image forming unit to carry out image forming on a medium including the RFID tag for information of which attribute is associated with the decolorable material in the table, and control the second image forming unit to carry out image forming on the medium for information of which attribute is associated with the non-decolorable material in the table.

The image forming apparatus according to an embodiment will be described with reference to the drawings. In each of the drawings, the same components will be depicted with the same reference sign unless otherwise depicted.

Figure 1:
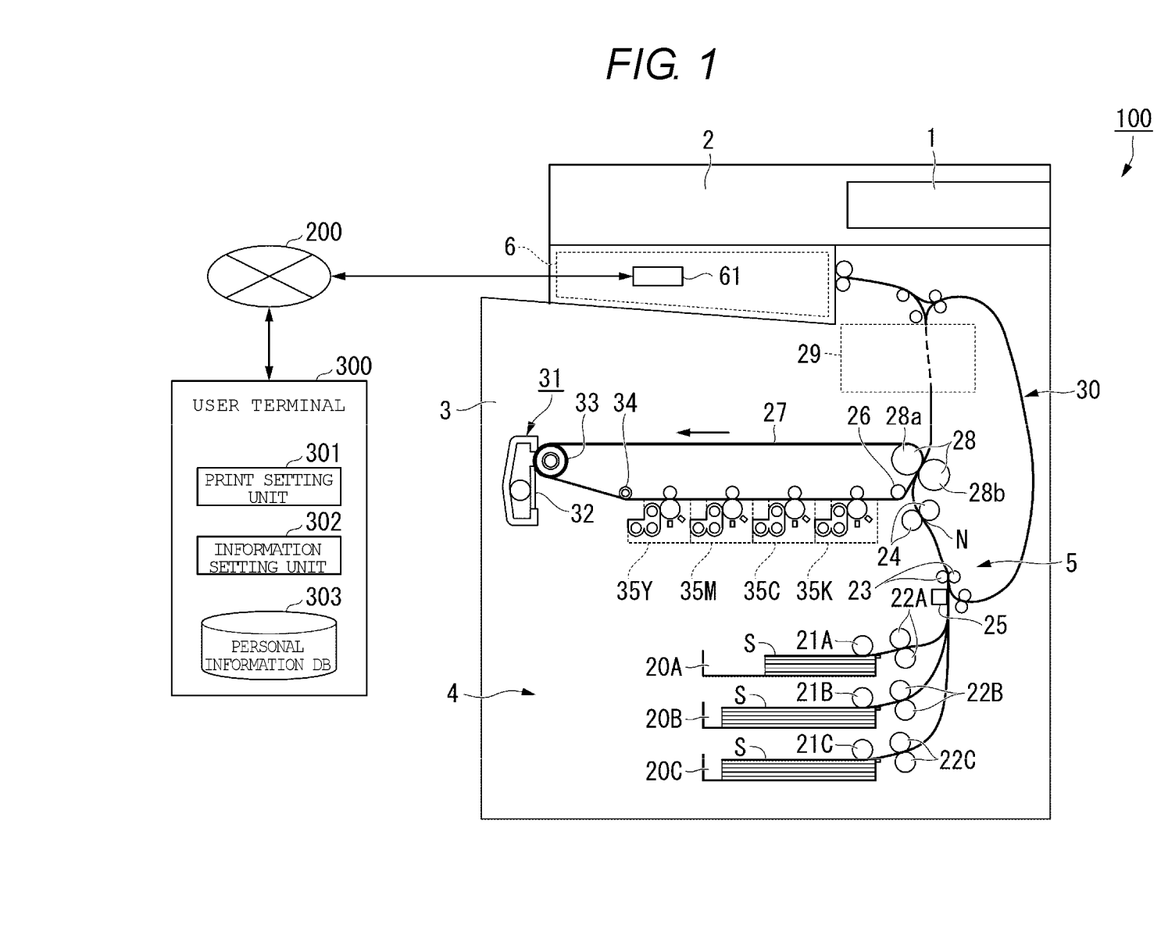
FIG. 1 illustrates a configuration of an image processing system which includes an image forming apparatus, and a configuration of the image forming apparatus according to an embodiment.

FIG. 1 illustrates a configuration example of an image processing system including an image forming apparatus, and a configuration example of the image forming apparatus according to an embodiment. The image processing system includes an image forming apparatus 100, a network 200, and a user terminal 300. The image processing system is a system in which a printed matter (for example, employee identification card, name tag, and the like) is output from the image forming apparatus 100. An image of personal information input in the user terminal 300 is formed on the printed matter.

The image forming apparatus 100 is, for example, a digital combined machine. The network 200 is, for example, a wired communication network such as a local area network (LAN), or a wireless communication network such as a wireless LAN. The user terminal 300 outputs a printing job, setting information, and the like to the image forming apparatus 100 through the network 200. The user terminal 300 is, for example, a personal computer. The user terminal 300 includes, for example, a display device such as a liquid crystal display and an input device such as a mouse and a keyboard (not illustrated in FIG. 1).

The image forming apparatus 100 includes a control panel 1, a scanner unit 2, a printer unit 3, a medium feeding unit 4, a transporting unit 5, and a control unit 6. The image forming apparatus 100 receives a printing job from the user terminal 300. The printing job includes an image file which is digital data. The image forming apparatus 100 forms an image on a card S, which is a medium, based on the digital data. Such image forming is performed according to an electrophotographic method with a recording agent. A specific example of the recording agent includes toner.

The image forming apparatus 100 includes two agents of a decolorable recording agent and a non-decolorable recording agent as the recording agent. When an image is formed on the card S, the image forming apparatus 100 forms an image with one or both of the decolorable recording agent and the non-decolorable recording agent. A toner material used as the decolorable recording agent has a function of being decolored by applying energy thereto. Applying energy means, for example, an external stimulus such as heat, light having a specific wavelength, and pressure. The decoloring in the present embodiment means that an image formed with a color (including an achromatic color such as white and black in addition to a chromatic color) which is different from a color of a background of the card S becomes visually unrecognizable by human eyes.

The card S is, for example, a sheet-like medium (image formation medium) such as an original document, a sheet in which letters, an image, or the like is printed, or a plain sheet. The size of the card S is not limited. The card S includes an RFID tag based on a radio frequency identifier (RFID) at a certain position therein. The RFID tag is an IC tag compatible with wireless communication through a frequency band such as an ultra high frequency (UHF) and a high frequency (HF). The RFID tag performs the wireless communication, for example, based on standards of the near field communication (NFC). The image forming apparatus 100 can read information from the RFID tag mounted in the card S, and write information in the RFID tag.

The control panel 1 is a portion of an input unit that causes an operator to input information for operating the image forming apparatus 100. The control panel 1 includes a touch panel or various hard keys which includes a button for performing an instruction of starting print, a button for setting operation modes, a button for setting print conditions, and the like. The control panel 1 includes an operation display unit which is a touch panel display device. The operation display unit of the control panel 1 displays, for example, a screen for setting whether an image is formed with decolorable toner (decolorable recording agent) or with normal toner (non-decolorable recording agent). The control panel 1 outputs a signal in accordance with an operation performed by a user, to the control unit 6 of the image forming apparatus 100.

The scanner unit 2 outputs image information of a matter to be copied (an image), based on intensity of light reflected by the matter to be copied. The scanner unit 2 outputs the image information to the printer unit 3.

The printer unit 3 forms a toner image on the card S based on an image signal from the outside thereof, with the decolorable toner or the normal toner, and the formed toner image is fixed onto the card S. The image signal is, for example, an image signal included in a printing job received from the user terminal 300 through the network 200. The printing job is used for performing an instruction of performing printing on an employee identification card.

The medium feeding unit 4 feeds a card S to the printer unit 3 one by one, at a timing at which the printer unit 3 forms a toner image. The medium feeding unit 4 includes a plurality of sheet feeding cassettes 20A, 20B, and 20C, and pickup rollers 21A, 21B, and 21C which respectively correspond to the sheet feeding cassettes 20A, 20B, and 20C. The sheet feeding cassettes 20A, 20B, and 20C respectively can store plural types of cards S. The transporting unit 5 includes feeding rollers 22A, 22B, and 22C, a transporting roller 23, a resist roller 24, and an RFID tag processing unit 25.

The RFID tag processing unit 25 is provided immediately upstream the transporting roller 23 in a transporting direction of the card S. The RFID tag processing unit 25 performs processing on an RFID tag mounted in the card S fed to the transporting roller 23. The RFID tag processing unit 25 performs processing of reading tag information from an RFID tag mounted in a card S, and performs processing of writing tag information in an RFID tag mounted in a card S. The RFID tag processing unit 25 is operated in accordance with control of the control unit 6 so as to output the tag information read from the RFID tag to the control unit 6.

Next, a detailed configuration of the printer unit 3 will be described. The printer unit 3 includes an intermediate transfer belt 27, a transfer unit 28, a fixing machine 29, a transfer belt cleaning unit 31, and image forming units 35K, 35C, 35M, and 35Y.

Each of the image forming units 35C, 35M, and 35Y forms a toner image on a photoconductor drum with the normal toner, in accordance with image data of a corresponding color. The recording-agent image forming unit 35K forms a toner image on the photoconductor drum with the decolorable toner, in accordance with corresponding image data. The image forming units 35K, 35C, 35M, and 35Y perform multiple transfer (primary transfer) onto the intermediate transfer belt 27 so as to overlap the toner images of the normal toners of colors and the toner image of the decolorable toner, which are on the photoconductor drums, with each other. The transfer unit 28 includes a support roller 28a and a secondary transfer roller 28b. The transfer unit 28 transfers the toner image which is primarily transferred onto the intermediate transfer belt 27, onto a surface of the card S at a secondary transfer position (secondary transfer).

The fixing machine 29 heats and presses the card S so as to fix the toner images which are transferred to the card S. The fixing machine 29 has a function of decoloring the image of the decolorable toner by heating. The decolorable toner is decolored by heating to a temperature higher than a temperature for fixing. The fixing machine 29 has a function of heating the card S at the temperature higher than the temperature for fixing, and thus can perform decoloring. The transfer belt cleaning unit 31 includes a blade 32 which scrapes residual toner on the surface of the intermediate transfer belt 27.

The printer unit 3 also includes a reversing unit 30. The reversing unit 30 transports the card S discharged from the fixing machine 29, to the transporting roller 23. The reversing unit 30 may reverse the card S by switchback, and transports the reversed card S to the transporting roller 23. The card S passing through the fixing machine 29 is ejected to an ejection tray when the card S does not pass through the reversing unit 30.

The control unit 6 includes a network communication unit 61, and controls the components of the image forming apparatus 100, in accordance with an operation mode, and the like. The network communication unit 61 is configured to communicate with the user terminal 300 through the network 200. The network communication unit 61 receives print conditions, personal information, and setting information which are used for forming images for the employee identification card, from the user terminal 300.

The user terminal 300 includes a print setting unit 301, an information setting unit 302, and a personal information DB (database) 303.

The print setting unit 301 corresponds to a first application that performs print setting for the image forming apparatus 100. The print setting unit 301 provides a user with a print condition screen for designating an image portion to be printed with the decolorable toner, and an image portion to be printed with the normal toner. The print condition screen includes, for example, a screen for designating a color condition. The color condition includes a color of the normal toner, and a color of the decolorable toner. The print condition screen includes, for example, a screen for designating an image condition which is an attribute of an image to be printed with the decolorable toner.

A user or a system manager may freely check setting for the color condition and the image condition, and thus may set the color of the decolorable toner and an image to be printed with the decolorable toner. A color selected as the color of the decolorable toner and a color selectable as the color of the normal toner are set on the print condition screen, so as to be different from each other. Thus, it can be recognized which information can be decolored, based on the color. The print condition screen may be a screen on which other print conditions when printing is performed with the decolorable toner may be preset at the next page and the like, when necessary.

The information setting unit 302 corresponds to a second application that performs processing relating to personal information in the employee identification card. The information setting unit 302 displays a screen relating to input of the personal information in the employee identification card.

The personal information DB 303 stores personal information input through the information setting unit 302. The information setting unit 302 displays a selection screen for selecting an item of the personal information, which functions as a target of being written in the RFID tag. The information setting unit 302 displays a setting screen for setting an attribute and the like of the personal information selected as the target to be written in the RFID tag. The selection screen and the setting screen may be the same as each other or different from each other.

In the setting screen, a position, a color, decolorable or non-decolorable (type of toner), the size, and the like when an image is formed on a card S may be set as the attribute of each personal information. In the setting screen, whether or not to protect the personal information when recording in the RFID tag is performed may be set as the attribute of each personal information. An administrator of personal information or a system manager checks a setting item on a selection setting screen and a designation setting screen, and sets an attribute and the like for each personal information. The user terminal 300 transmits print conditions set on the print condition screen through the print setting unit 301, and personal information and setting information which are selected on the setting screen through the information setting unit 302, to the image forming apparatus 100.

In addition to the personal information used for the employee identification card, more detailed personal information of a person is stored in association with identification information of the person, in the personal information DB 303. The identification information of the person includes an employee number of the person (employee), for example. The more detailed personal information includes information regarding a superior, a colleague, and the like of the person, information regarding a start date of employment, a type of employment, the possessed qualification, and the previous affiliation, and information of a reward and punishment history, and the like.

Figure 2:
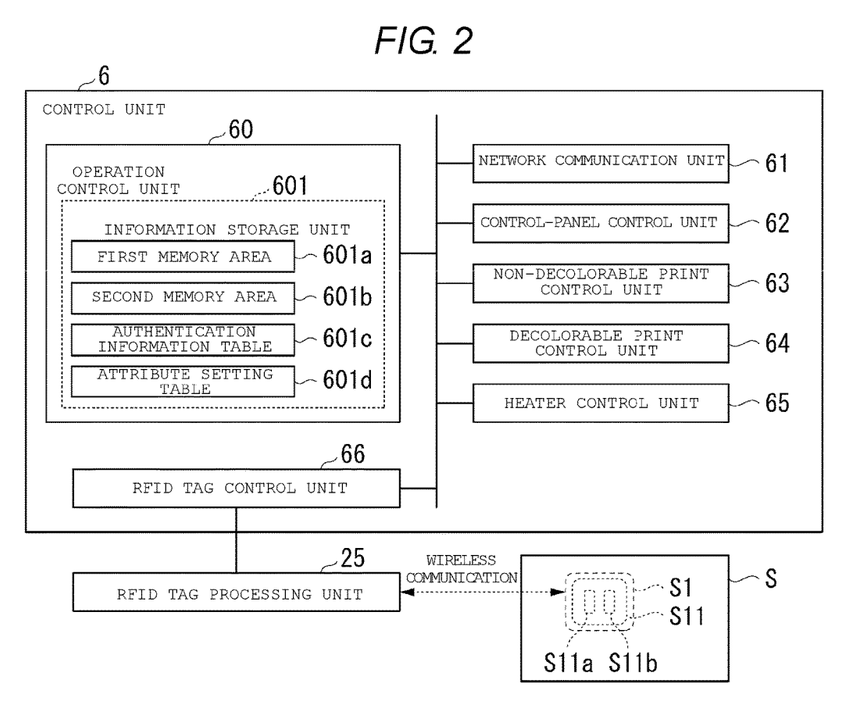
FIG. 2 is a block diagram of a control unit of the image forming apparatus.

Next, a detailed configuration example of the control function of the control unit 6 will be described.

FIG. 2 illustrates detailed configuration example of the control function of the control unit 6. The control unit 6 includes an operation control unit 60, a network communication unit 61, a control-panel control unit 62, a non-decolorable print control unit 63, a decolorable print control unit 64, a heater control unit 65, and an RFID tag control unit 66.

The control unit 6 controls the RFID tag processing unit 25 to read or write tag information from or in an RFID tag S1 mounted in a card S.

The RFID tag S1 mounted in the card S includes a built-in memory S11 for recording the tag information. The tag information includes personal information related to an employee identification card. The built-in memory S11 includes a first memory region S11a for storing rewritable personal information, and a second memory region S11b for storing non-rewritable personal information, which is protected through protection setting.

The operation control unit 60 controls the other units in the control unit 6. The operation control unit 60 includes an information storage unit 601 for storing personal information required for forming an image on an employee identification card or a name tag, and authentication information. The operation control unit 60 generates tables (authentication information table and attribute setting table) and the like which will be described below, based on the print conditions, the personal information, and the setting information which are received by the network communication unit 61. The operation control unit 60 stores the generated tables in the information storage unit 601.

The operation control unit 60 performs authentication of a user using the authentication information stored in the information storage unit 601. The operation control unit 60 stores the personal information received from the user terminal 300, in the information storage unit 601. The operation control unit 60 updates personal information stored in the information storage unit 601, based on the personal information received from the user terminal 300.

The personal information storage unit 601 includes a first memory area 601a, a second memory area 601b, an authentication information table 601c, and an attribute setting table 601d. The first memory area 601a is for recording personal information which maybe changed usually, such as an affiliation or a telephone number. The second memory area 601b is for recording personal information which is not usually changed, such as an employee number, a name, a company name, and a format image, such as a design of the employee identification card. The personal information recorded in the first memory region S11a of the built-in memory S11 of the above-described RFID tag S1 corresponds to some or all of information recorded in the first memory area 601a. The personal information recorded in the second memory region S11b of the built-in memory S11 of the above-described RFID tag S1 corresponds to some or all of information recorded in the second memory area 601b.

The second memory area 601b may store personal information that is less likely to be changed, for example, information that is changed once per several years to several ten years. The authentication information table 601c stores authentication information. The authentication information is, for example, information regarding employee numbers and names of all employees who are authorized to use the image forming apparatus 100.

The attribute setting table 601d is a table (attribute storing unit) in which an attribute is set for each item of the personal information. The operation control unit 60 stores the personal information in the first memory area 601a or the second memory area 601b, based on the attribute setting table 601d. The operation control unit 60 performs the above storage processing at a timing at which the personal information is received, or at a timing at which the personal information is updated. The attribute setting table 601d includes a plurality of attribute setting tables generated for different users. In the attribute setting table 601d, for example, the attribute setting table of each user is stored in correlation with the user's employee number.

Figure 3:
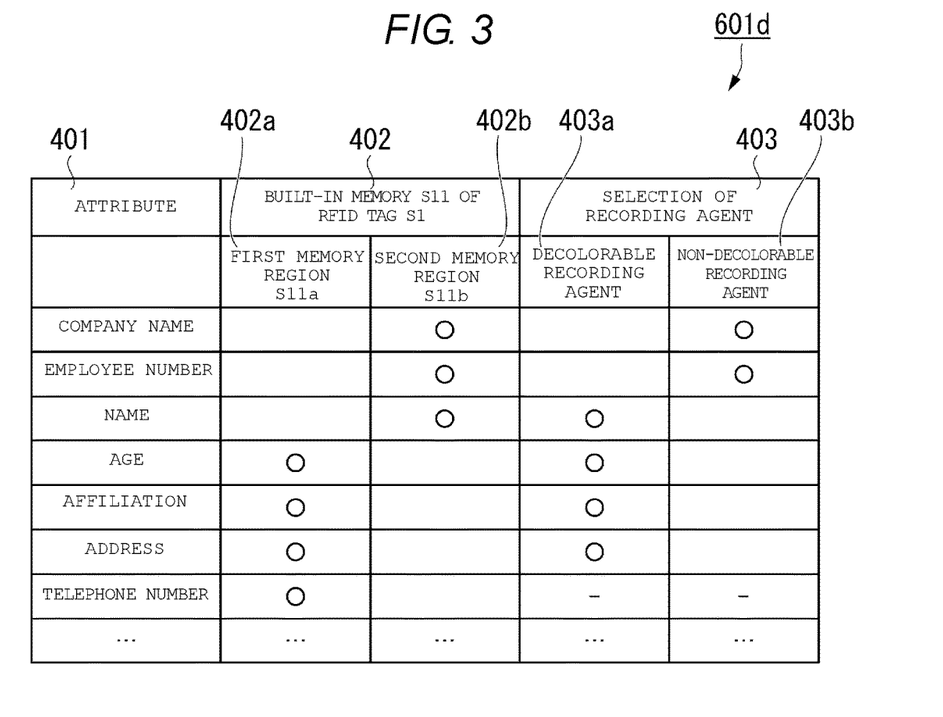
FIG. 3 illustrates an example of an attribute setting table.

Here, a specific example of the attribute setting table 601d will be described. FIG. 3 illustrates an example of personal information and attribute setting table of the personal information.

A column 401 in the attribute setting table 601d indicates attribute of the personal information. As indicated by the column 401, the attributes of the personal information include "company name", "employee number", "name", "age", "affiliation", "address", "telephone number", and the like. The attributes illustrated in FIG. 3 are an example, and may include another attribute for the employee identification card.

The area the built-in memory S11 of the RFID tag S1 for storing the corresponding personal information (i.e., the first memory region S11a or the second memory region S11b) is set for each row in a column 402 of the attribute setting table 601d. The column 402 includes a column 402a and a column 402b. In the column 402a, "o" is set for each of attributes to be recorded in the first memory region S11a of the built-in memory S11. In the column 402b, "o" is set for each of attributes to be recorded in the second memory region S11b of the built-in memory S11. FIG. 3 indicates that "company name", "employee number", and "name" are recorded in the second memory region S11b which is protected so as to be non-rewritable. FIG. 3 also indicates that "age", "affiliation", "address", and "telephone number" are recorded in the first memory region S11a so as to be rewritable.

Whether an image is formed with the decolorable recording agent or the non-decolorable recording agent is set in a column 403 of the attribute setting table 601d. The column 403 includes a column 403a and a column 403b. In the column 403a, "o" is set for each of attributes to be printed with the decolorable recording agent. In the column 402b, "o" is set for each of attributes to be printed with the non-decolorable recording agent. FIG. 3 indicates that "company name" and "employee number" are printed with the non-decolorable recording agent. FIG. 3 also indicates that "name", "age", "affiliation", and "address" are printed with the decolorable recording agent. Regarding "telephone number", "-" is set, which means that no image is printed. In the attribute setting table 601d, some of the personal information may be set as non-printed information. Thus, a user can freely set information not to be printed on the employee identification card.

The network communication unit 61 performs communication through the network 200 as illustrated in FIG. 1. The control-panel control unit 62 controls a display and the like of the control panel 1. The control-panel control unit 62 receives personal information of a user of which authentication succeeds, from the operation control unit 60. When there is a user-customized print setting screen which is customized for the user, the control-panel control unit 62 displays the user-customized print setting screen, based on the received personal information. The print setting screen may include a user interface for changing setting which is set by a printer driver, to another setting customized for the user.

The non-decolorable print control unit 63 controls the image forming units 35K, 35C, 35M, and 35Y to form images with the normal toner of the corresponding colors. The decolorable print control unit 64 controls the image forming units 35K, 35C, 35M, and 35Y to form images with the decolorable toner of corresponding colors.

The heater control unit 65 controls a heating temperature of the fixing machine 29. The heater control unit 65 controls the heating temperature of the fixing machine 29 to be at, for example, 100 degrees, when fixation processing is performed. The heater control unit 65 controls the heating temperature of the fixing machine 29 to be at, for example, 130 degrees, when decoloring processing is performed.

The RFID tag control unit 66 controls the RFID tag processing unit 25 to read and write tag information from or in the RFID tag S1 mounted in the card S. The RFID tag control unit 66 outputs personal information included in the tag information read from the RFID tag S1, to the operation control unit 60. The operation control unit 60 performs authentication of a user using the personal information included in the tag information received from the RFID tag control unit 66, and authentication information stored in the information storage unit 601.

The operation control unit 60 records information of the column 402a of the attribute setting table 601d in the first memory area 601a. The operation control unit 60 records information of the column 402b of the attribute setting table 601d in the second memory area 601b.

The operation control unit 60 instructs the RFID tag control unit 66 to store the personal information recorded in the first memory area 601a in the first memory region S11a of the RFID tag S1. The operation control unit 60 also instructs the RFID tag control unit 66 to store the personal information recorded in the second memory area 601b in the second memory region S11b of the RFID tag S1. The operation control unit 60 makes the instruction to the RFID tag control unit 66, for example, based on the tag information at a timing at which authentication of the user is performed.

The operation control unit 60 outputs image forming control information to the non-decolorable print control unit 63 and the decolorable print control unit 64, based on information of the column 403 of the attribute setting table 601d. The non-decolorable print control unit 63 performs image forming processing for personal information with the normal toner, based on the information of the column 403b of the attribute setting table 601d. The decolorable print control unit 64 performs image forming processing for personal information with the decolorable toner, based on the information of the column 403a of the attribute setting table 601d.

The operation control unit 60 determines whether or not an employee number and a name included in the personal information received from the RFID tag control unit 66 are included in authentication information stored in the authentication information table 601c. The operation control unit 60 performs authentication of a user based on the determination.

Next, the processing of the control unit 6 will be described by a specific example of an employee identification card (card S) on which an image is formed using the attribute setting table 601d and the personal information.

Figure 4:
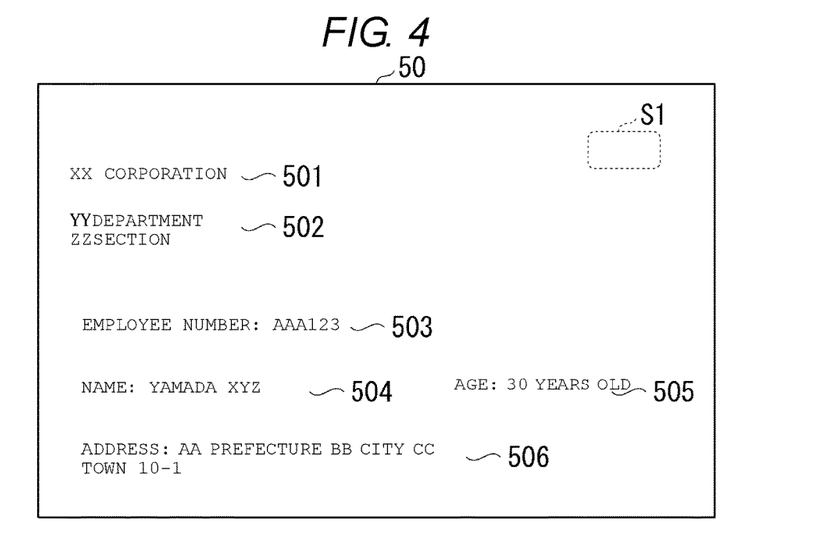
FIG. 4 illustrates an example of an employee identification card on which personal information is printed.

FIG. 4 illustrates an example of the employee identification card (card S) on which personal information of an employee is printed. Specifically, a company name 501, an affiliation 502, an employee number 503, a name 504, an age 505, and an address 506 are printed on an employee identification card 50. The employee identification card 50 has an RFID tag S1 mounted therein. The company name 501, the employee number 503, and the name 504 on the employee identification card 50 are printed with the normal toner, for example, of a first color. The affiliation 502, the age 505, and the address 506 on the employee identification card 50 are printed with the decolorable toner, for example, of a second color which is different from the first color. In the RFID tag S1 of the employee identification card 50, "XX Corporation" as company name, "AAA123" as employee number, and "YAMADA XYZ" as name is recorded in the first memory region S11a. In the RFID tag S1 of the employee identification card 50, "XYΔ Department YY× Section" as affiliation, "30 years old" as age, and "AA Prefecture BB City CC Town 10-1" as address is recorded in the second memory region S11b. In the RFID tag S1 of the employee identification card 50, "03-WXYZ-1111" as telephone number is also recorded in the second memory region S11b.

A device configuration of the control unit 6 includes appropriate hardware and a computer. The computer includes a CPU, a memory, an input and output interface, an external storage device, and the like. The memory and the external storage device configure a storage unit of the control unit 6. The control unit 6 causes the computer to execute a control program, and thus achieves the above-described control functions. In addition, the control unit 6 operates appropriate hardware, and thus achieves the above-described control functions.

Next, an image forming operation of the image forming apparatus 100 will be described using an operation when an image is formed on the employee identification card illustrated in FIG. 4, as an example.

Figure 5:
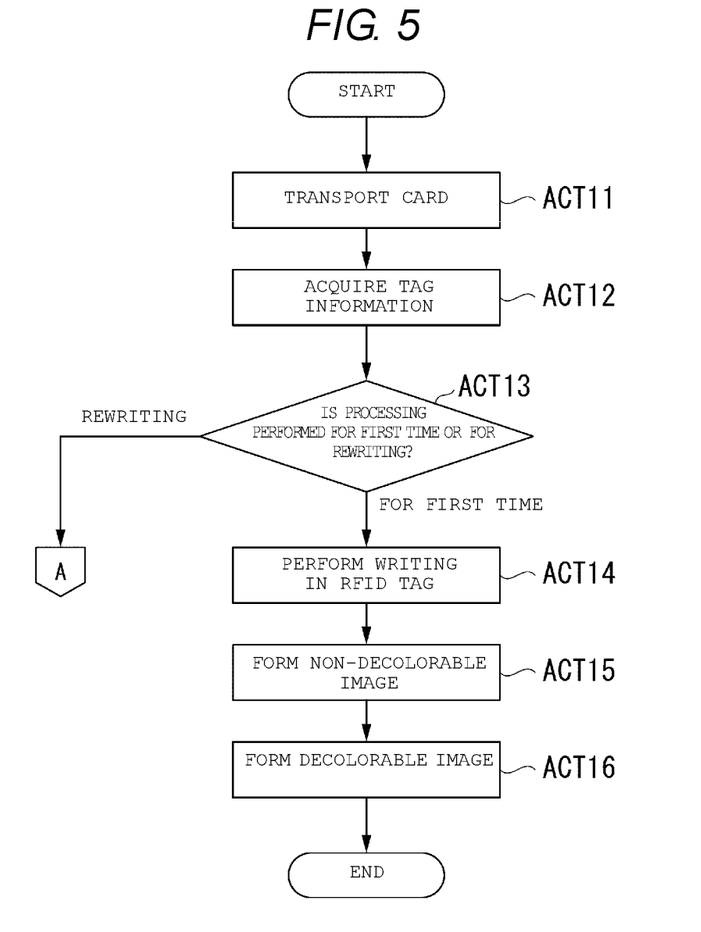
FIG. 5 is a flowchart illustrating an image forming operation carried out by the image forming apparatus.
Figure 6:
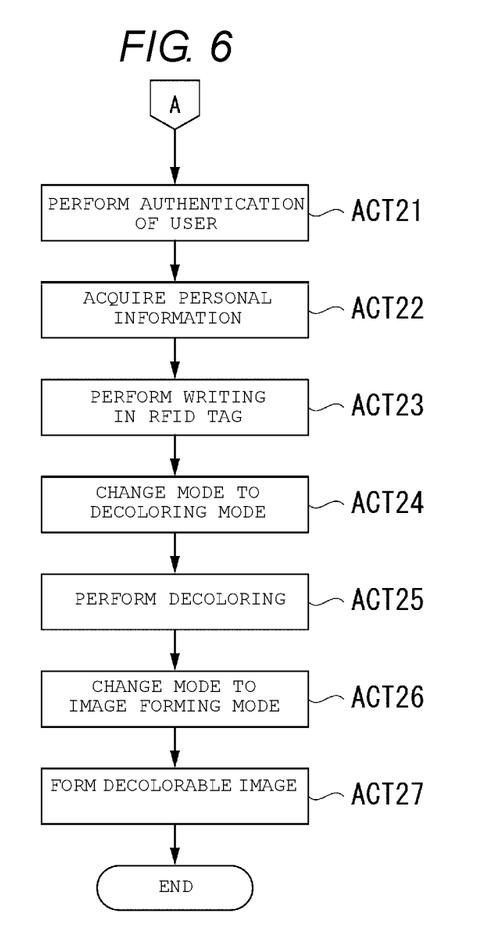
FIG. 6 is a flowchart illustrating a derivative image forming operation carried out by the image forming apparatus.

FIG. 5 and FIG. 6 are flowcharts illustrating an image forming operation carried out by the image forming apparatus 100. Here, it is assumed that the following processes (1) to (4) have been completed: (1) an input process of personal information, setting information, and the like in the user terminal 300; (2) an acquiring process of personal information, setting information, and the like used for an employee identification card, from the user terminal 300 of the image forming apparatus 100; (3) a process in which a user places a card S for the employee identification card, on the sheet feeding cassette of the image forming apparatus 100; and (4) a process in which a user presses a button to start printing images for the employee identification card, on the control panel 1 of the image forming apparatus 100.

The image forming apparatus 300 extracts one card S from the sheet feeding cassette and transports the extracted card S to a position immediately upstream the transporting roller 23 in the transporting direction (ACT11). The position of the card S immediately upstream the transporting roller 23 is a position at which the RFID tag S1 mounted in the card S and the RFID tag processing unit 25 can wirelessly communicate with each other. The control unit 6 reads tag information from the RFID tag S1 in the card S through the RFID tag processing unit 25 (ACT12).

The control unit 6 determines whether initial image forming processing for the card S is performed or image forming processing for rewriting is performed, based on the tag information read from the RFID tag S1 (ACT13). For example, when the control unit 6 determines that personal information is not included in the read tag information (which means that no personal information is recorded in the RFID tag S1), the control unit 6 determines that the initial image forming processing for the card S is performed. A configuration for determining whether the initial image forming processing for the card S is performed is not limited to the above configuration. For example, a user may set whether the initial image forming processing is performed or the image forming processing for rewriting is performed, through the control panel 1.

Here, when it is determined that the initial image forming processing is performed (first time in ACT13), the control unit 6 controls the RFID tag processing unit 25 to write personal information in the RFID tag S1 mounted in the card S (ACT14). The non-decolorable print control unit 63 performs image forming processing for personal information with the normal toner, based on the information of the column 403b of the attribute setting table 601d (ACT15). The non-decolorable print control unit 63 operates to form the company name 501, the employee number 503, and the name 504 illustrated in FIG. 4 as an image on the card S, with the normal toner.

After the image is formed with the normal toner, the decolorable print control unit 64 performs image forming processing for personal information with the decolorable toner, based on the information of the column 403a of the attribute setting table 601d (ACT16). The decolorable print control unit 64 operates to form the affiliation 502, the age 505, and the address 506 illustrated in FIG. 4 as an image on the card S, with the decolorable toner. Through the above processing, the image forming apparatus 100 performs image formation on the card S or the like, and outputs an employee identification card (illustrated in FIG. 4).

Next, processing when it is determined that image forming processing for rewriting is performed, in ACT13 of FIG. 5, will be described with reference to FIG. 6.

For example, when personal information is included in the read tag information (which means that recording of personal information in the RFID tag S1 has been done previously), the control unit 6 determines that image forming for rewriting is performed.

Here, when it is determined that the image forming processing for rewriting is performed (rewriting of ACT13), the control unit 6 performs authentication of a user using personal information (below referred to as first personal information) included in the tag information (ACT21). The control unit 6 acquires personal information (below referred to as second personal information) of the user of which authentication succeeds, from the first memory area 601a and the second memory area 601b (ACT22).

The control unit 6 performs processing of writing the second personal information in the RFID tag S1 (ACT23). Thus, information recorded in the RFID tag S1 is updated from the first personal information to the second personal information. Specifically, the image forming apparatus 100 writes all or part of the second personal information as the personal information that is set to be stored in the first memory region S11a of the RFID tag S1.

Then, the control unit 6 changes the operation mode of the image forming apparatus 100 to a decoloring mode (ACT24). The image forming apparatus 100 performs the decoloring processing by heating the card S at the temperature higher than the temperature for fixing, by controlling the fixing machine 29 (ACT25). Specifically, the image forming apparatus 100 decolors images of the affiliation 502, the age 505, and the address 506 printed on the card S.

Then, the control unit 6 changes the operation mode of the image forming apparatus 100 from the decoloring mode to an image forming mode (ACT26). When the operation mode is changed to the image forming mode, the image forming apparatus 100 transports the card S subjected to the decoloring processing, to the resist roller 24 without reversing the card S by passing through the reversing unit 30. The image forming apparatus 100 forms an image on the card S with the decolorable toner (ACT27). Specifically, the image forming apparatus 100 forms an image (new image) of the affiliation 502, the age 505, and the address 506 on the card S with the decolorable toner.

When the decoloring processing of the card S is performed by an external device and the like, ACT24, ACT25, and ACT26 may be omitted. Here, it is assumed that a user places the employee identification card for which decoloring has been completed, on the sheet feeding cassette.

As described above, the image forming apparatus 100 can form an image with the decoloring toner and the normal toner in accordance with the attribute setting table 601d. The attribute setting table 601d corresponds to setting for forming an image of personal information which is likely to be changed, with the decoloring toner and for forming an image of personal information which is less likely to be changed, with the normal toner. According to the image forming apparatus 100 of the present embodiment, decoloring may be performed on the personal information which is likely to be changed when the change is required, and the changed personal information may be printed with the decolorable toner in an area on which the decoloring has been performed. Accordingly, when a portion of the personal information described on the employee identification card is changed, the employee identification card can be continuously used replacement with another employee identification card.

The above-described image processing system according to the embodiment includes one image forming apparatus 100 and one user terminal 8. However, the configuration of the image processing system is not limited thereto. The image processing system may include a plurality of image forming apparatuses 100 and a plurality of user terminals 8. In addition, a position of the RFID tag processing unit 25 in the above-described image forming apparatus 100 is an example. As long as the RFID tag processing unit 25 is positioned upstream of the printer unit 3 in a transporting direction, the RFID tag processing unit 25 may be positioned at any of the transporting path of the card S.

A developer included in each of the image forming units 35K, 35C, 35M, and 35Y may accommodate both the decolorable toner and the normal toner of a corresponding color. In this case, the image forming units 35K, 35C, 35M, and 35Y can form an image by switching a type of toner between the decolorable toner and the normal toner.

The printer unit 3 of the image forming apparatus 100 according to the above-described embodiment forms an image by fixing a toner image. However, the configuration of the printer unit 3 is not limited thereto. The printer unit 3 of the image forming apparatus 100 may form an image by an ink jet method.

According to at least one embodiment which is described hitherto, descriptions of a portion of an employee identification card can be decolored in accordance with change of the personal information, and thus new descriptions may be overwritten. Thus, it is possible to reuse the employee identification card without waste. Even when the contents of the personal information written in the RFID tag as the tag information can be limited, more detailed personal information can be retrieved from the user terminal 300 based on the tag information. Thus, it is possible to refer to more detailed personal information than personal information stored in an image formation medium or an RFID tag, when an image is formed on an employee identification card.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus, comprising:
a first image forming unit configured to form an image with a decolorable material;
a second image forming unit configured to form an image with a non-decolorable material;
an RFID processor configured to write data in an RFID tag;
a memory unit for storing a plurality of attributes, first setting information indicating whether each of the attributes is subjected to be re-written in the RFID tag, and second setting information indicating whether each of the attributes is subjected to be printed, on a medium including the RFID tag, by the first image forming unit or by the second image forming unit; and
a controller configured to:
control the first image forming unit to carry out image forming of an attribute, in which the second setting information indicates the first image forming unit carries out image forming thereof, on the medium,
control the second image forming unit to carry out image forming of an attribute, in which the second setting information indicates the second image forming unit carries out image forming thereof, on the medium, and
control the RFID processor to write an attribute, which the first setting information indicates is to be re-written in the RFID tag, in a first memory region, which is re-writable, of the RFID tag, and to write an attribute, which the first setting information indicates is to be not re-written in the RFID tag, in a second memory region, which is not re-writable, of the RFID tag.

2. The image forming apparatus according to claim 1, wherein
the controller is further configured to control the first and second image forming units not to carry out image forming of an attribute, which the first and second setting information indicate are not to be image formed by the first and second image forming units.

3. The image forming apparatus according to claim 1, wherein
the first and second setting information indicate that
a first attribute is to be printed by the first image forming unit, and to be re-written in the RFID tag, and
a second attribute is to be printed by the second image forming unit, and not to be re-written in the RFID tag.

4. The image forming apparatus according to claim 1, wherein
each of the attributes is related to a type of personal information.

5. The image forming apparatus according to claim 1, wherein
a color of the decolorable material is different from a color of the non-decolorable material.

6. The image forming apparatus according to claim 1, wherein
the first image forming unit is configured to form the image with one or more of a plurality of decolorable materials having different colors, and
the second image forming unit is configured to form the image with one or more of a plurality of non-decolorable materials having different colors.

7. The image forming apparatus according to claim 1, further comprising:
a decoloring unit configured to decolor an image formed with the decolorable material.

8. The image forming apparatus according to claim 7, wherein
the first image forming unit carries out the image forming on a region of the medium from which the image has been decolored by the decoloring unit.

9. The image forming apparatus according to claim 1, wherein
the RFID processor is also configured to read information stored in an RFID tag, and
the controller is further configured to control the RFID processor to overwrite latest information in the RFID tag, when the read information is different from the latest information.

10. The image forming apparatus according to claim 1, wherein the decolorable material is decolored at or above a predetermined temperature.

11. A method for issuing a medium including an RFID tag with an image printed thereon, comprising:

storing a plurality of attributes, first setting information indicating whether each of the attributes is subjected to be re-written in the RFID tag, and second setting information indicating whether each of the attributes is subjected to be printed, on a medium including the RFID tag, with a decolorable material or with a non-decolorable material;

receiving a print command for information corresponding to a plurality of attributes;

forming an image of an attribute, in which the second setting information indicates an image thereof is printed with the decolorable material, on the medium with the decolorable material, forming an image of an attribute, in which the second setting information indicates an image thereof is printed with the non-decolorable material, on the medium with the non-decolorable material, writing an attribute, which the first setting information indicates is to be re-written in the RFID tag, in a first memory region, which is re-writable, of the RFID tag, and writing an attribute, which the first setting information indicates is to be not re-written in the RFID tag, in a second memory region, which is not re-writable, of the RFID tag.

12. The method according to claim 11, wherein not forming an image of an attribute, which the first and second setting information indicate are not to be image formed with the decolorable material and the non-decolorable material.

13. The method according to claim 11, wherein the first and second setting information indicate that a first attribute is to be printed with the decolorable material, and to be re-written in the RFID tag, and a second attribute is to be printed with the non-decolorable material, and not to be re-written in the RFID tag.

14. The method according to claim 11, wherein each of the attributes is related to a type of personal information.

15. The method according to claim 11, wherein a color of the decolorable material is different from a color of the non-decolorable material.

16. The method according to claim 11, wherein when an image is formed with the decolorable material, the image is formed with one or more of a plurality of decolorable materials having different colors, and when an image is formed with the non-decolorable material, the image is formed with one or more of a plurality of non-decolorable materials having different colors.

17. The method according to claim 11, further comprising:
decoloring an image formed on the medium before image forming with the decolorable material and image forming with the non-decolorable material are carried out.

18. The method according to claim 17, wherein the image forming with the decolorable material is carried out on a region of the medium that has a decolored image.

19. The method according to claim 11, further comprising:
reading information stored in the RFID tag; and
overwriting latest information in the RFID tag, when the read information is different from the latest information.

20. The method according to claim 11, wherein the decolorable material is decolored at or above a predetermined temperature.

* * * * *